April 22, 1958

K. O. WIMAN 2,831,356

MOVEMENT TRANSMITTING MECHANISM WITH
AUTOMATIC STOPPING MEANS

Filed Feb. 5, 1957

United States Patent Office

2,831,356
Patented Apr. 22, 1958

2,831,356

MOVEMENT TRANSMITTING MECHANISM WITH AUTOMATIC STOPPING MEANS

Karl Olov Wiman, Gastrike-Hammarby, Sweden, assignor to Kopparfors Aktiebolag, Ockelbo, Sweden, a corporation of Sweden Application February 5, 1957, Serial No. 638,295

Claims priority, application Sweden February 20, 1956

4 Claims. (Cl. 74—128)

The invention relates to a movement transmitting mechanism provided with a device for automatically stopping a started rotary movement after a whole revolution or a certain determined fraction thereof. Such an exactly predetermined rotary movement may for instance be desired for turning an element a certain angle or for advancing desired portions of lengths of material.

The invention comprises a toothed wheel mounted to transmit a rotary motion and having at least one clearing of restricted depth, a driving member meshing with the teeth of the wheel to cause the wheel to rotate, and stopping means arranged to stop the movement of the driving member upon its engagement in a clearing of restricted depth, whereby also the rotation of the wheel is stopped.

The driven toothed wheel may either be fixedly mounted on a shaft to be driven or it may be rotatably journalled on a shaft and directly connected with another wheel to be given a desired rotary movement.

The driving member may consist of another toothed wheel mounted on a shaft displaceable in parallel to itself, and according to a modification of the invention the driving toothed wheel can instead be provided with at least one clearing having a smaller depth. According to a preferred embodiment, however, the driving member is arranged to perform a reciprocating motion in a direction substantially tangential to the toothed wheel. Said driving member is also movable in radial direction of the toothed wheel and is actuated by a spring to engage the teeth. A pawl prevents in the known way the wheel from rotating in one direction, and thus a rotation step by step is effected in that the teeth and/or the meshing portion of the driving member are bevelled to slip over each other as the driving member moves in the blocked direction of rotation of the wheel. When moving outwards from the wheel the driving member may be stopped by a shoulder slightly before it reaches its end position during the working stroke, whereby the motion is immediately interrupted.

Preferably the movement transmitting mechanism according to the invention is combined with a compressed-air driven motor as such a motor is capable of absorbing stresses caused by the sudden stops.

The invention will be described more in detail with reference to the accompanying drawings, in which an embodiment is shown as applied to an apparatus for twisting together wires.

Figure 1:
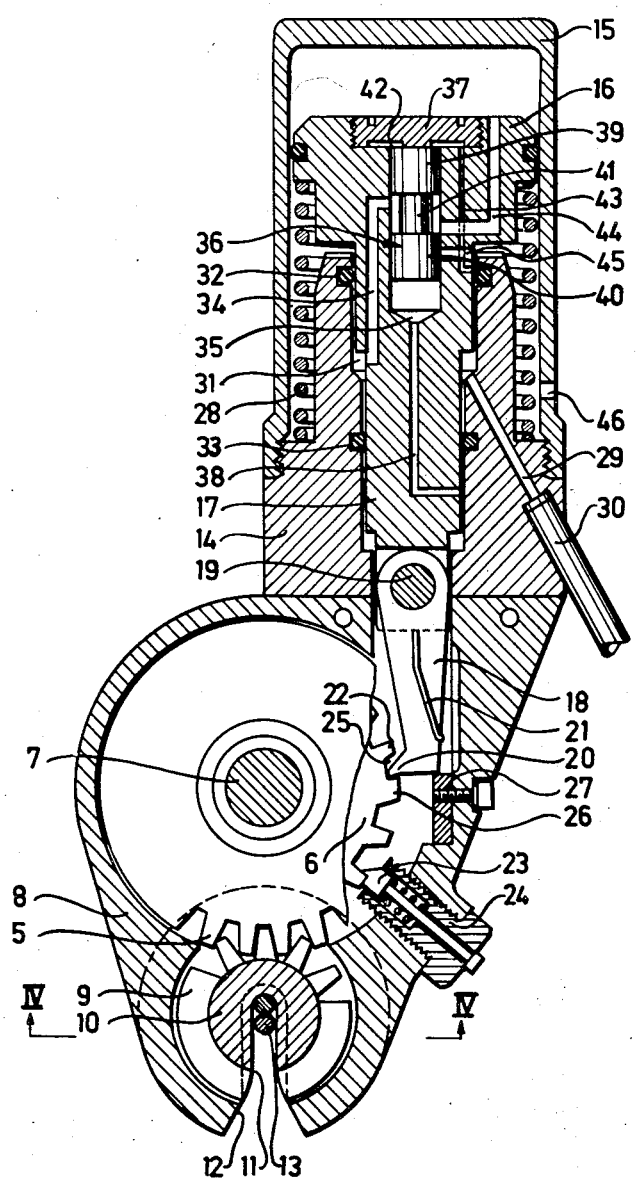
Figure 1 shows a longitudinal section through the apparatus with a built-in compressed-air driven motor in the stop position.

A gear 5 and a toothed wheel 6 are fixedly mounted close to each other on a common shaft 7 which is journalled in a casing 8. A smaller gear 9 meshing with the gear 5 is integral with rather thick shaft pivots 10 also journalled in the casing 8. The gear 9 and its shaft pivots 10 have an axial groove 11 (see also Fig. 4) which in cross section extends radially inwards from the periphery a distance past the axis of the gear. Outside the gear the casing has an opening 12 corresponding to the groove 11. Said opening 12 extends axially along the gear and its shaft pivots as well as radially through the end walls of the casing to the same depth as the groove 11. In a certain rotary position of the gear, shown in Fig. 1, the opening 12 and the groove 11 form a continuous gap, into which objects can be introduced radially from the outside.

As mentioned above, the apparatus is intended for connecting two metal wires by twisting and therefore the width of the gap must be dimensioned to receive the wires to be twisted. For this purpose the end portions of the opening 12 located outside the pivots 10 have a width which is only slightly greater than the thickness of one wire, so that two wires 13 put one on the other cannot be twisted in relation to each other in these passages. Also the groove 11 within the gear 9 has the same dimension, whereas the portions of the groove passing through the shaft pivots are widened to a width at least equal to the total thickness of both wires. This varying width of the groove is clearly apparent from Fig. 4. It should be noted that the groove 11 within the gear must have the same width as that of a clearing between two teeth.

Figure 4:
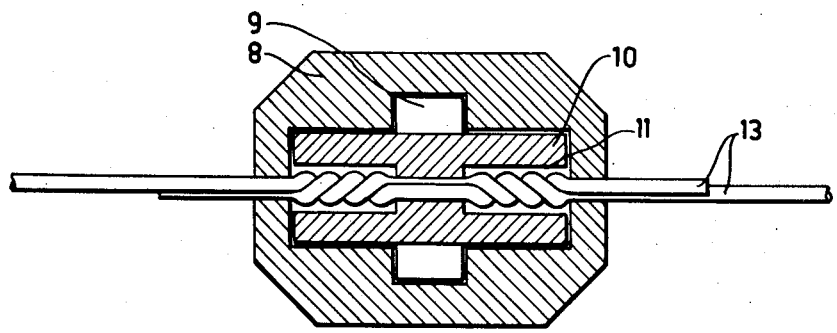
Figure 4 shows the lower portion of the apparatus in section along the line IV—IV in Figure 1.

The device operates as follows. On rotation the gear 9 brings along the wire portions positioned in its centre, while the wire portions located in the openings in the end walls of the casing are secured against rotation. The non-guided wire portions within the shaft pivots will thereby be twisted together, i. e., be twined around each other, and the result will be such a wire connection as shown in Fig. 4. When introducing and removing wires the groove 11 must always be in alignment with the opening 12 in the casing, and therefore the gear 9 must rotate a full number of revolutions for each operation. Two revolutions have proved to be quite sufficient. The larger, driving gear 5 is dimensioned to rotate one revolution in the same period of time.

Opposite to the gap the casing carries a substantially cylindrical block 14 secured by welding. A cylinder 15 closed at one end has its open end threaded on said block 14 which thus forms the other end wall of the cylinder. The cylinder contains a piston 16 described hereinafter, the piston rod 17 of which is slidably journalled in a corresponding boring in the end wall 14. The axis of the cylinder and thus of the piston rod is directed along a line located slightly outside and in parallel to a tangent of the outer periphery of the toothed wheel 6.

The member driving the toothed wheel 6 consists of an arm 18 connected by means of a pivot 19 to the outer end of the piston rod 17 to be turned slightly in the plane of the toothed wheel. A hook 20 projecting substantially at right angles and directed towards the toothed wheel is provided at the free end of the arm 18. A spring 21 is adapted to cause the arm 18 to swing in the direction against the toothed wheel, and the hook 20 is preferably dimensioned to engage the clearings between the teeth 22 down to the bottom.

A spring-actuated pawl 23 is mounted in a sleeve 24 threaded through the wall of the casing 8. The pawl is adapted to engage the teeth to prevent rotation in direction anti-clockwise in Fig. 1. When the arm 18 moves forward, i. e. while the piston is moved from the end position shown in Fig. 2, the hook 20 engages a tooth and turns the toothed wheel in direction clockwise. The forward movement ceases, when the outer end of the arm has reached approximately a line extending through the centre of the toothed wheel in right angles to the axis of the piston rod. The toothed wheel will then have rotated an angle corresponding to one pitch. When thereafter the piston rod moves backwards or inwards, the toothed wheel is retained by the pawl 23, and the arm 18 is swung outwards against the action of the spring 21 in that the bevelled rear of the hook 20 glides up the inclined rear surface of next tooth.

As shown at 25 in Fig. 1, one clearing of the toothed wheel is only half as deep as the other ones and moreover narrower, i. e. it occupies a smaller angle. The preceding tooth 26 is correspondingly thicker. When the hook 20 engages the tooth during its movement forwards it hits the bottom of this shallower clearing 25, whereby the arm 18 is swung slightly outwards or away from the toothed wheel. Shortly before the arm has reached its foremost or normal end position, its outer end hits a shoulder 27 provided on the inside of the casing 8, and the movement is stopped in the position shown in Fig. 1. Of course, the motor is so constructed that the piston is automatically reversed in both its end positions, and for this reason the piston must evidently be stopped before it reaches such an end position, as otherwise the movement would continue in opposite direction. However, since the tooth 26 is slightly thicker than the other ones the toothed wheel is also in this case turned an equally large angle as when any of the other teeth 22 is actuated by the hook 20. In other words, the increased thickness of the tooth 26 corresponds exactly to the distance between the stop surface of the shoulder 27 and the normal reversing position of the outer end of the arm 18.

Figure 2:
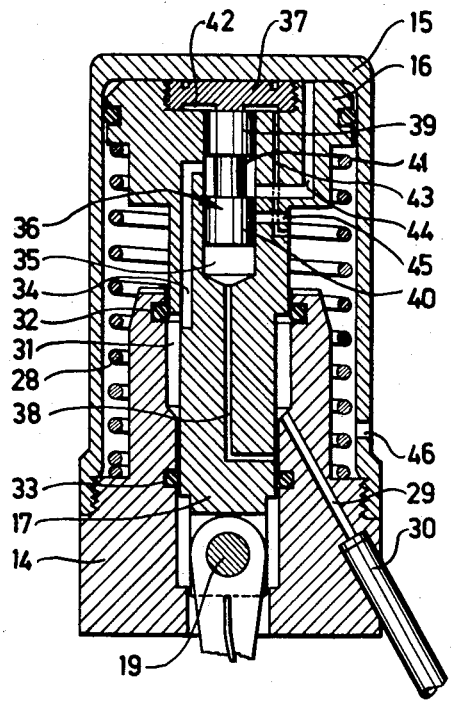
Figures 2 and 3 show the compressed-air motor in the same section as Figure 1 but with the piston in two opposite end positions.

In the initial position shown in Fig. 2, the piston 16 is positioned close to the bottom of the cylinder 15 where it is retained by a powerful compression spring 28 resting against the end wall 14. A channel 29 extends through the end wall and is intended to be connected to a source of compressed air by means of a conduit 30 containing a two-way valve, not shown. The piston motor is started by opening said valve, which can be made automatically in connection with other automatized operations.

The channel 29 ends in an annular chamber 31 formed between the piston rod 17 and a sleeve-shaped portion of the block 14. The length of the chamber 31 is limited by an inner sealing 32 and an outer sealing 33. The chamber 31 communicates with a channel 34 extending substantially axially through the piston rod and the piston and opening into a central, axial boring 35 in the piston. The boring contains a slide 36 consisting of two plungers 39, 40 and an intermediate portion 41 having a reduced diameter. The plungers 39, 40 are ground to fit snugly in the boring. The boring is closed by a cap 37 threaded into the upper end of the piston 16. In the initial position shown in Fig. 2, the slide is held in its upper end position close to the cap 37, in that the inner or lower end of the boring 35 communicates with the chamber 31 by a channel 38. An annular groove 42 at the inside of the cap 37 communicates with a channel 43 extending through the piston to the cylindrical surface of the piston rod, slightly below the piston 16.

In the position shown in Fig. 2, the channel 34 is in communication with the annular chamber formed around the middle portion 41 of the slide and another channel 44 through the piston 16 extends from said annular chamber to the top surface of the piston. Thus, compressed air is led to the top of the cylinder, and the piston 16 is thereby moved downwards against the action of the spring 28.

Figure 3:
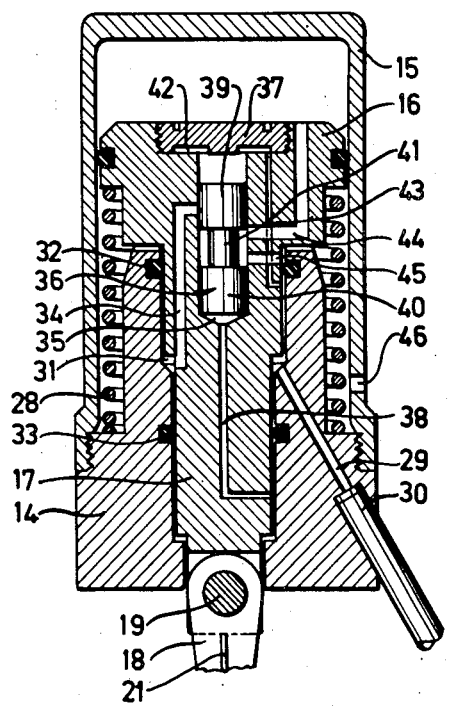

At the downward movement of the piston the inlet of the channel 38 passes the sealing ring 33, whereby the space below the piston slide is vented, and when the piston 16 has reached its lower end position the inlet opening of the channel 43 is located below the sealing ring 32 in communication with the compressed-air conduit, so that the piston slide 36 is quickly returned to its lower end position, shown in Fig. 3. When this has occurred, the supply of compressed air to the upper side of the piston 16 is interrupted as the upper plunger 39 of the slide now blocks the outlet from the channel 34, and instead the space above the piston 16 is vented through the channel 44, the annular space around the middle portion of the slide 36 and an outlet channel 45 which extends radially through the piston rod, and which has been exposed by the downward movement of the slide 36. The air escapes to the atmosphere through an outlet 46 provided in the cylinder jacket. The spring 28 returns the piston to its upper position, whereupon the piston has completed a full stroke, and the operation described is repeated.

When the arm 18 is stopped in its downward movement by the shoulder 27, as shown in Fig. 1, the piston does not reach its lower end position. In this case the inlet of the channel 43 does not pass the sealing ring 32 and therefore it is not connected to the compressed-air conduit. The slide 36 then remains in its upper position, so that the pressure still acts on the upper end of the piston 16, and thereby the movement of the piston is stopped. When the two-way valve in the compressed-air conduit 30 is adjusted to shut off the source of compressed air and simultaneously to vent the cylinder, the spring 28 returns the piston to its upper position, and the apparatus is now ready for a new operation.

The device according to the invention is of course not restricted to the use of the piston motor described, but the latter is only intended to illustrate an apparatus working according to the principle of the invention.

It is also evident that the invention is not limited to a device for twisting wires but may equally well be used for other purposes.

What I claim is:

1. A movement transmitting mechanism provided with automatic stopping means, comprising a toothed wheel mounted to transmit a rotary motion and having at least one clearing of restricted depth, a driving member meshing with the teeth of the wheel to cause the wheel to rotate, and means arranged to stop the movement of the driving member upon its engagement in a clearing of restricted depth, whereby also the rotation of the wheel is stopped.

2. A movement transmitting mechanism provided with automatic stopping means, comprising a toothed wheel mounted to transmit a rotary motion and having at least one clearing of restricted depth, a pawl securing the wheel against rotation in one direction, a member movable substantially tangentially as well as radially to the wheel, spring means actuating the member to mesh with the teeth of the wheel, driving means causing said member to perform a reciprocating motion in direction tangentially to the wheel, whereby the wheel is rotated in its free direction, and means arranged to stop the tangential movement of the member, when the latter is displaced radially outwards owing to its engagement in a clearing of restricted depth, whereby also the rotation of the wheel is stopped.

3. A movement transmitting mechanism provided with automatic stopping means, comprising a toothed wheel mounted to transmit a rotary motion and having at least one clearing of restricted depth, a pawl securing the wheel against rotation in one direction, a member movable substantially tangentially as well as radially to the wheel, spring means actuating the member to mesh with the teeth of the wheel, a driving motor arranged to reverse its direction of motion and connected to said member to cause it to perform a reciprocating motion in direction tangentially to the wheel, whereby the wheel is rotated in its free direction, and a shoulder arranged to stop the working stroke of the member, when the latter is displaced radially outwards owing to its engagement in a clearing of restricted depth, said shoulder being located to engage the reciprocating member somewhat before it has reached its end position, whereby the reverse of the motor is prevented.

4. A movement transmitting mechanism provided with automatic stopping means, comprising a toothed wheel mounted to transmit a rotary motion, a pawl securing the wheel against rotation in one direction, at least one clearing of restricted depth and reduced width in the wheel, the tooth preceding said clearing, as seen in the direction of rotation, being correspondingly thicker, a member movable substantially tangentially as well as radially to the wheel, spring means actuating the member to mesh with the teeth of the wheel, driving means causing said member to perform a reciprocating motion in direction tangentially to the wheel, whereby the wheel is rotated in its free direction, and a shoulder arranged to stop the working stroke of the member, when the latter is displaced radially outwards owing to its engagement in a clearing of restricted depth, said shoulder being located at a distance from the end position of said working stroke equal to the increase in thickness of the thicker tooth.

No references cited.